United States Patent
Bock

[15] 3,673,220
[45] June 27, 1972

[54] MANUFACTURE OF PYRANTHRONES

[72] Inventor: Gustav Bock, Neustadt, Germany

[73] Assignee: Badische Anilin- & Soda-Fabrik Aktiengesellschaft, Ludwigshafen/Rhine, Germany

[22] Filed: Oct. 9, 1970

[21] Appl. No.: 79,681

[30] Foreign Application Priority Data

Oct. 14, 1969 Germany.....................P 19 51 708.9

[52] U.S. Cl.............................................................260/360
[51] Int. Cl. ...........................................................C09b 3/42
[58] Field of Search..................................................260/360

[56] References Cited

OTHER PUBLICATIONS

Lubs, The Chemistry of Synthetic Dyes and Pigments, pp. 450–451, (1955)

*Primary Examiner*—Lorraine A. Weinberger
*Assistant Examiner*—E. Jane Skelly
*Attorney*—Johnston, Root, O'Keeffe, Keil, Thompson & Shurtleff

[57] ABSTRACT

A new process for the manufacture of pyranthrones (I) from 2,2'-dialkyl-1,1'-dianthraquinonyls (II) by heating (II) at from 150° to 210° C. in polar organic solvents in the presence of alkali metal acetates.

6 Claims, No Drawings

MANUFACTURE OF PYRANTHRONES

The present invention relates to a new process for the manufacture of pyranthrones from 2,2'-dialkyl-1,1'-dianthraquinonyls.

German Patent No. 175,067 discloses that pyranthrones may be obtained by heating 2,2'-dimethyl-1,1'-dianthraquinonyls in alkali metal hydroxide melts, in the presence or absence of alcohols, at temperatures of from 140° to 250° C.

This prior art process suffers from the disadvantage that such alkali metal hydroxide melts are difficult to handle and the products of the process always contain impurities which greatly restrict their use as dyes, especially as pigment dyes. Since this drawback may only be obviated by complicated and consequently uneconomical purifying processes, an object of this invention is to provide a process which enables pyranthrones to be manufactured in a simple manner and in the required high degree of purity.

This and other objects are achieved in accordance with this invention by a process in which pyranthrones are manufactured by heating 2,2'-dialkyl-1,1'-dianthraquinonyls in polar organic solvents and in the presence of alkali metal acetates at temperatures of from 150° to 210° C.

Particularly suitable starting materials for the new process are 2,2'-dialkyl-1,1'-dianthraquinonyls having Formula II:

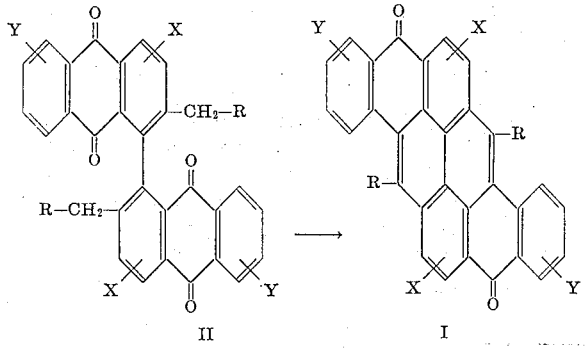

from which pyranthrones having Formula I are formed. In the Formula I and II R stands for hydrogen or an alkyl having one to two carbon atoms and X and Y each stands for hydrogen, halogen such as chlorine or bromine, or an alkyl having one to two carbon atoms.

The manufacture of unsubstituted pyranthrones is of particular industrial interest.

Neither the amount of alkali metal acetate used nor the amount of said solvents used is critical for the success of the reaction. The presence of catalytic amounts of alkali acetate, for example, is sufficient to cause cyclization. However, in order to keep the reaction time to a minimum, it is particularly advantageous to use from 0.5 to 1 mole of alkali metal acetate per mole of compound having Formula II. Particularly suitable alkali metal acetates are sodium the alkali metal acetates is carried out in polar organic solvents which are stable under the reaction conditions. Examples of such solvents are alcohols such as ethylene glycol, diethylene glycol or dipropylene glycol or organic solvents containing the group

such as N,N-dialkylcarboxylamides, e.g. N,N'-dimethyl acetamide, N,N-dimethyl formamide or compounds, such as N-methylpyrrolidone, in which the group

forms part of a heterocyclic ring.

There are no restrictions as regards the type and quantity of solvent to be used, for example when low-boiling solvents are used, the process may be carried out under pressure. However, it is advantageous to use solvents of the said type which boil within or above the specified temperature range. N-methylpyrrolidone or dipropylene glycol and ethylene glycol have proved to be particularly advantageous. The amount of solvent used depends on technical conditions under which the reaction mixture can still be stirred. Where conventional reaction vessels are used, it is advantageous to use an amount of solvent which is equal to from two to four times the weight of dianthraquinonyl used.

The reaction to form the pyranthrones is complete after about one to two hours. The products of the process may be isolated in a simple manner, for example by suction filtration, washing and drying.

The pyranthrones produced by the new process are distinguished by such a high degree of purity that they can be used as dyes without the necessity for further purification.

The invention is further illustrated by the following examples in which parts are by weight.

EXAMPLE 1

30 parts of 2,2'-dimethyl-1,1'-dianthraquinonyl is heated with 4 parts of anhydrous sodium acetate in 60 parts of N-methylpyrrolidone at from 180° to 190° C. for 1 1/2 hours. The mixture is then cooled to room temperature and the precipitated pyranthrone is isolated by suction filtration and washed with water until it is free from sodium acetate. After drying, there are obtained 25 parts of pyranthrone in the form of coarse orange-brown crystals.

If the dry 2,2'-dimethyl-1,1'-dianthraquinonyl is replaced by the equivalent amount of a filter cake of this compound moist with water and the water is distilled off from the reaction mixture until the reaction temperature is reached, pyranthrone is obtained in the same yield and purity.

EXAMPLE 2

20 parts of 2,2'-dimethyl-4,4'-dichloro-1,1'-dianthraquinonyl is heated in 50 parts of ethylene glycol containing 5 parts of potassium acetate at 170° C. for 1 hour. The reaction mixture is then cooled to room temperature and suction filtered. The solid residue is washed with until it is free from potassium acetate and dried. There are thus obtained 16 parts of 1,9-dichloropyranthrone in the form of orange crystals.

I claim:

1. A process for the manufacture of pyranthrones having the formula:

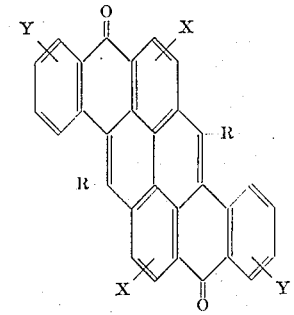

where R stands for hydrogen or an alkyl having one or two carbon atoms and X and Y each stands for hydrogen, halogen or an alkyl having one or two carbon atoms, wherein 2,2'-dialkyl-1,1'-dianthraquinonyls having the formula:

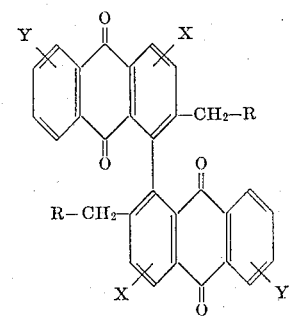

are heated in polar organic solvents and in the presence of alkali metal acetates at temperatures of from 150° to 210° C.

2. A process as claimed in claim 1 wherein compounds having formula II where X and Y stand for chlorine or bromine are reacted.

3. A process as claimed in claim 1 wherein the alkali metal acetate used is sodium or potassium acetate.

4. A process is claimed in claim 1 wherein from 0.5 to 1 mole of alkali metal acetate is used per mole of 2,2'-dialkyl-1,1'-dianthraquinonyl (II).

5. A process as claimed in claim 1 wherein the polar organic solvents used are selected from the group consisting of polyols, polyglycols, and solvents which contain the group

and which the group

may form part of a heterocyclic ring.

6. A process as claimed in claim 1 wherein the polar organic solvents used are selected from the group consisting of ethylene glycol, diethylene glycol, dipropylene glycol, N,N-dimethyl acetamide, N,N-dimethyl formamide, N-methylpyrrolidone and mixtures thereof.

* * * * *